March 11, 1924.

J. L. WHEELER

ANTISPINNING DEVICE

Filed May 19, 1922

Inventor:
John L. Wheeler.
By Elliott & Mumey
Attorneys.

March 11, 1924. 1,486,709

J. L. WHEELER

ANTISPINNING DEVICE

Filed May 19, 1922 2 Sheets-Sheet 2

Inventor:
John L. Wheeler.

By Elliott & Ammen
Attorneys

Patented Mar. 11, 1924.

1,486,709

UNITED STATES PATENT OFFICE.

JOHN L. WHEELER, OF ST. LOUIS, MISSOURI, ASSIGNOR TO THE MEASUREGRAPH COMPANY, A CORPORATION OF DELAWARE.

ANTISPINNING DEVICE.

Application filed May 19, 1922. Serial No. 562,253.

*To all whom it may concern:*

Be it known that I, JOHN L. WHEELER, a citizen of the United States, residing in the city of St. Louis and State of Missouri, have invented new and useful Improvements in Antispinning Devices, of which the following is a specification.

This invention relates to measuring machines such as fabric measuring and cost computing machines. These machines usually embody in their construction a measuring roller over which the fabric is pulled in being measured. During the measuring movement the fabric is pressed against the measuring roller by means of a presser roller. It sometimes happens that in measuring a remnant, the remnant is pulled through the machine with sufficient rapidity to give the measuring roller considerable momentum, the result of which is that the measuring roller will continue to rotate even after the end of the fabric has passed the measuring roller. This will produce an inaccurate measurement.

The general object of the present invention is to provide simple means for preventing such a spinning of the measuring roller as that referred to above, and to provide simple means for automatically stopping the rotation of the roller as soon as a measured remnant has completed its movement between the rollers; also to provide means whereby the raising of the presser roller away from the measuring roller, after a measuring movement, will operate automatically to disengage or release the stopping means from the measuring roller.

Further objects of the invention will appear hereinafter.

The invention consists in the novel features and in the general combination of parts to be particularly described hereinafter, all of which contribute to produce a simple and efficient anti-spinning device. A preferred embodiment of my invention will be particularly described in the following specification, while the broad scope of my invention will be pointed out in the appended claims.

Figure 1:
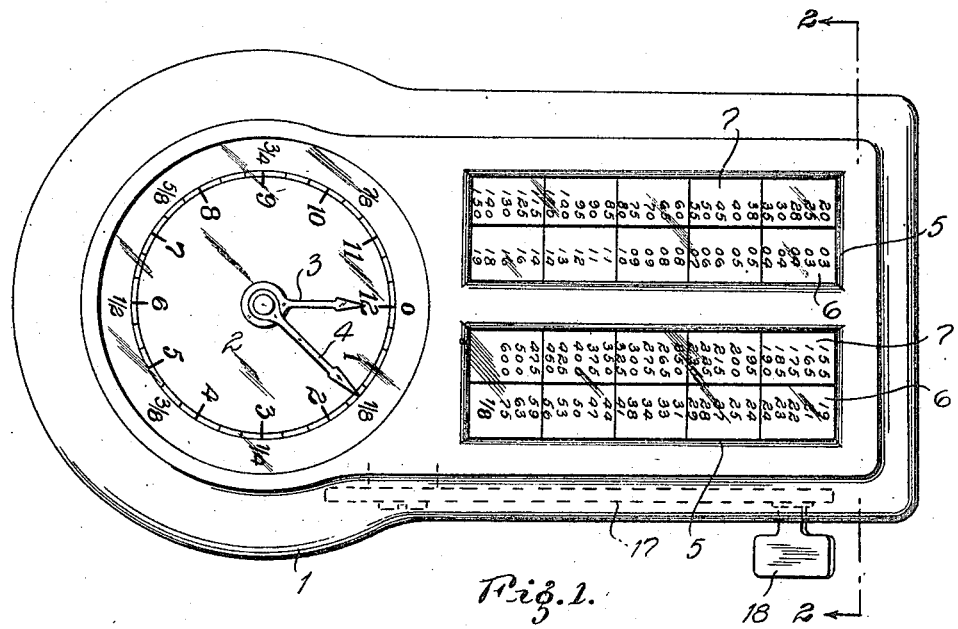
Figure 1 is a plan of a fabric measuring and cost computing machine embodying my invention.

The machine to which I have applied my invention may have a casing 1, on the upper side of which a dial 2 may be provided with hands or pointers 3 and 4 which co-operate to indicate the length measured by the machine. The upper side of the casing is also provided with windows 5 through which charts 6 may be seen, and these charts carry numbers which align with scales 7, indicating different price rates per yard, at which the fabric may be sold. The charts 6 and the hands 3 and 4 are driven by a measuring roller 8, which is mounted to rotate in the lower portion of the casing 1. (See Figures 2 and 3.) Through suitable mechanism, not illustrated, the shaft 9 of this roller actuates the driving mechanism of the machine.

Figures 2, 3:
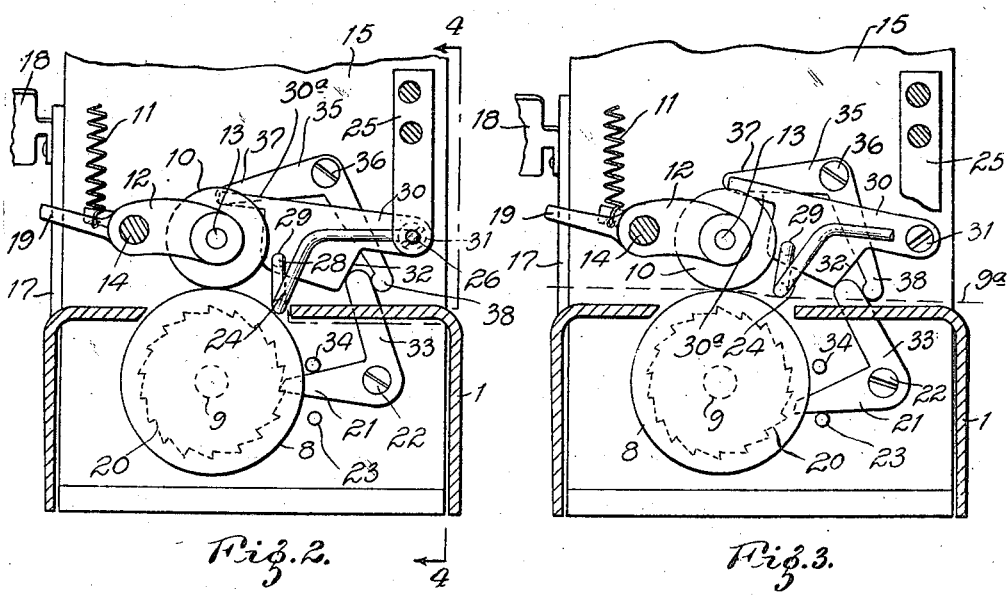
Figure 2 is a vertical section taken through the machine about on the line 2—2 of Figure 1.
Figure 3 is a view similar to Figure 2, but indicating the manner in which the fabric passing through the machine co-operates with the mechanism to permit the free movement of the measuring roller until the end of the remnant has passed the measuring roller.
Figure 4:
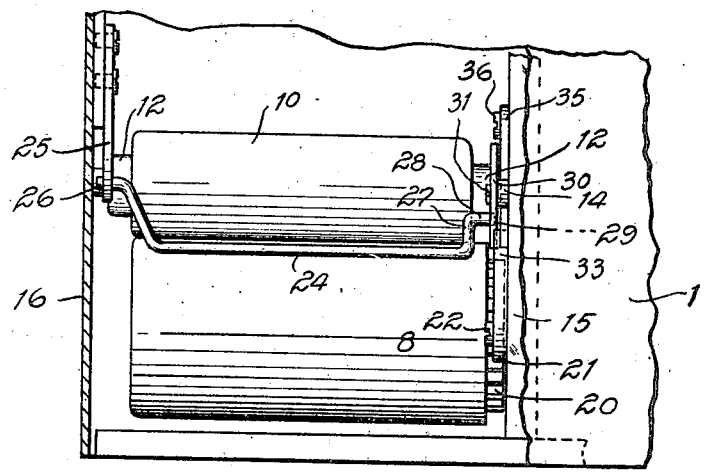
Figure 4 is a section taken substantially on the line 4—4 of Figure 2.

In a measuring operation the fabric is pulled over the upper face of the measuring roller in about the position indicated by the dotted line 9ª in Figure 3. As it passes over the measuring roller, it is pressed against the same by a presser roller 10, which is movably mounted, in such a way that it can be held against the fabric and the measuring roller by means of a coil spring 11. In the present instance the presser roller is supported on a rocker frame having arms 12 carrying the shaft 13 of the presser roller, which extends parallel with the shaft 9 of the measuring roller. The rocker frame includes a rock shaft 14, the ends of which are mounted to rock in frame plates 15 and 16. (See Figure 4.) This presser roller may be raised and held raised when desired, by any suitable means such as those illustrated in Patent #1409567, issued to E. T. Nugent, March 14, 1922. The means for this purpose usually includes a lever 17 (Figure 1) which carries a cutter for marking the edge of the fabric at the point where it is to be cut off, and this lever may be operated at will by means of a thumb-plate 18, which is exposed on the exterior of the casing and moves in a slot in the casing (not illustrated.) As the lever 17 descends, it strikes an arm 19 which projects into its path; this arm is carried by the rock shaft 14 and when it is depressed it operates to raise the presser roller.

In applying my invention to such a machine I provided a detent wheel which is mounted to rotate when the measuring roller 8 rotates. I prefer to attach or form this detent wheel rigidly with the measuring roller. In the present instance the detent wheel is in the form of a ratchet wheel 20, with which cooperates a detent pawl 21 which is pivotally mounted on a screw 22, secured to the frame plate 15. The detent pawl 21 normally rests by gravity upon a pin or rest 23, on the frame plate 15, and in this position its tip is out of contact with the detent wheel.

I provide means which normally rests upon the upper side of the fabric and is supported thereby in a relatively elevated position. This means is movably mounted and operates to fall by gravity when the fabric passes from beneath it. As this means or member falls, it actuates clock-wise the detent pawl 21 so as to move it into engagement with the detent wheel 20 and thereby stops the measuring roller.

In order to accomplish this, I provide a movable bar or bail 24, which may be formed of straight wire, the outer end of which is pivotally supported in a bracket 25, by means of an offset wrist or trunnion 26 (Figures 2 and 4), and the other end of the bar has an upwardly bent extension 27, which extension is turned laterally to form a wrist or gudgeon, which is received in an opening 29, in the side of a cam or cam-plate 30. This cam-plate is pivotally mounted on the frame-plate 15 by means of a pivot screw 31 (Figures 3 and 4), and has a cam edge 32, which engages the upper end of a pawl arm 33, which forms the upper part of the detent pawl 21.

The pivot or wrist 26 is in axial alignment with the pivot screw 31.

With this construction it will be evident that the fabric being pulled through the machine will support the under side of the bar and hold the cam 30 elevated, but when the end of the fabric passes the bar 24, the bar and the cam 30 will fall by gravity. In doing so the cam edge 32 will rock the pawl 21 in a clockwise direction and move the end of the pawl into the path of the teeth of the ratchet wheel 20. The ratchet wheel, due to the momentum of the measuring roller, will rotate the pawl until it goes up against a fixed stop pin 34, in the frame plate 15. When this occurs, the pawl will arrest the rotation of the roller.

I provide means controlled by the presser roller frame, for disengaging the detent wheel or ratchet wheel 20 from the pawl 21, when the presser roller is raised. For this purpose I provide a bell crank lever 35, which is pivotally mounted at 36 on the frame plate 15 and this bell crank lever has a substantially horizontal arm which extends out over the arm 12 of the presser roller frame. It also has a substantially vertical arm 38, the lower end of which engages the righthand edge of the pawl arm 33 of the detent pawl. Now, when the presser roller frame is raised, the upper edge of its arm 12 will strike the arm 37 and give the bell crank 35 a clockwise rotation. This will cause the arm 38 to engage the arm 33 of the detent pawl 21 and rotate it in an anti-clockwise direction, which disengages it from the ratchet wheel.

The raising of the presser roller frame also operates to raise the cam 30. In order to accomplish this, I simply provide the cam 30 with an extension 30$^a$ which projects out into the path of the arm 12 of the presser roller frame.

Figures 5, 6:
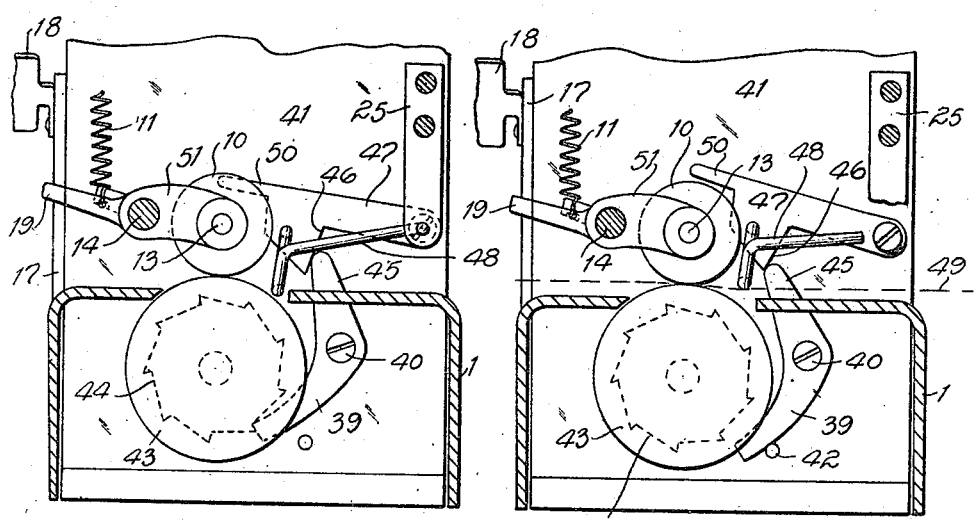
Figure 5 is a view similar to Figure 2, but showing a modified embodiment of my invention.
Figure 6 is a view similar to Figure 5 and illustrating the manner in which the fabric co-operates to hold the mechanism in a position which will permit free rotation of the measuring roller until the end of the remnant passes the measuring roller.

If desired, the detent pawl may be constructed in such a way that it will disengage itself by gravity from the ratchet wheel, in which case it becomes unnecessary to utilize the bell crank lever 35. This modification of the invention is illustrated in Figures 5 and 6, in which the pawl 39 is supported on a pivot screw 40, at a more elevated point on the frame plate 41 than is the pawl 21, so that the pawl tends to gravitate to the position in which it is shown in Figure 6, at which time it is supported upon a rest in the form of a fixed pin 42. The measuring roller 43 carries a fixed ratchet wheel 44. The detent pawl 39 has an upwardly extending pawl 45, which extends up into position to be engaged by a cam edge 46, formed on a cam 47, constructed and mounted similarly to the cam 30. A bar 48 is provided, which is similar to, and mounted like the bar 24. The fabric passes on the path indicated by the dotted line 49 and engages the under side of a bar 48 and holds the cam up. (See Figure 6.) As soon as the end of the fabric passes the bar 48, the cam and bar descend by gravity and a cam edge 46 actuates the detent pawl 39 to throw it into engagement with the ratchet wheel 44, which stops the rotation of the measuring roller. This cam 47 is likewise provided with a finger 50 which projects over the path of the arm 51 of the presser roller frame, so that when the presser roller frame is raised, the cam will be raised, thereby permitting the detent pawl 39 to fall out of engagement with the ratchet wheel.

It is understood that the embodiment of the invention described herein is only one of the many embodiments my invention may take, and I do not wish to be limited in the practice of my invention nor in my claims, to the particular embodiment set forth.

What I claim is:

1. In an anti-spinning device, the combination of a measuring roller, a detent wheel mounted to rotate therewith, a detent pawl, a movably mounted presser roller to press the fabric against the measuring roller during the measuring movement, a movable member mounted so as to be supported by the fabric when being pulled past the measuring roller, means actuated by said movable member when it is unsupported by the fabric, for actuating the detent pawl to co-operate with the detent wheel and stop the measuring roller, and automatic means for disengaging the detent pawl from the wheel when the presser roller is moved away from the measuring roller.

2. In an anti-spinning device, the combination of a measuring roller, a detent wheel mounted to rotate therewith, a detent pawl to co-operate with the wheel, a movably mounted presser roller to press the fabric against the measuring roller during the measuring movement, a movably mounted bar constructed to rest upon the fabric and be supported thereby when the fabric is being pulled through the machine, a cam connected with the bar and supported thereby when the bar is resting on the fabric, said cam operating to engage the detent pawl and move the same into engagement with the detent wheel to stop the measuring roller when the end of the fabric passes from under the bar.

3. In an anti-spinning device, the combination of a measuring roller, a detent wheel mounted to rotate therewith, a detent pawl to co-operate with the detent wheel, a movably mounted presser roller to press the fabric against the measuring roller during the measuring movement, a movably mounted bar constructed to rest upon the fabric and be supported thereby when the fabric is being pulled through the machine, a cam connected with the bar and supported thereby when the bar is resting on the fabric, said cam operating to engage the detent pawl and move the same into engagement with the detent wheel to stop the measuring roller when the end of the fabric passes from under the bar, a presser roller frame supporting the presser roller and means projecting into the path of the presser roller frame whereby the raising of the presser roller raises the cam and thereby releases the detent pawl from the detent wheel.

4. In an anti-spinning device, the combination of a measuring roller, a detent wheel in the form of a ratchet wheel rigid with the measuring roller, a detent pawl mounted to co-operate with the detent wheel, a movably mounted presser roller to press the fabric against the measuring roller during the measuring movement, a movably mounted bar constructed to rest upon the fabric and to be supported thereby when the fabric is being pulled through the machine, a presser roller frame carrying the presser roller, a cam engaged by one end of the bar and mounted to have pivotal movement with the bar, said detent pawl having a tail co-operating with the cam when the bar and the cam are unsupported by the fabric, said cam and the tail of the pawl co-operating to project the end of the pawl into the path of the teeth of the ratchet wheel, and a bell crank lever having an arm in the path of movement of the presser roller frame and having an arm engaging the tail of the detent pawl, whereby the raising of the presser roller operates to release the detent wheel from the detent pawl.

5. In an anti-spinning device, the combination of a measuring roller, a ratchet wheel in the form of a ratchet wheel rigid with the measuring roller, a detent pawl mounted to co-operate with the detent wheel and mounted so that it tends to gravitate into a position which will hold it out of the path of movement of the teeth of the ratchet wheel, a rest for supporting the pawl with its end adjacent to the teeth of the ratchet wheel, a presser roller frame, a presser roller actuated thereby to press the fabric against the measuring roller during the measuring movement, a pivotally mounted bar constructed to be supported by the fabric during the measuring movement and operating to fall by gravity when the fabric passes out of the machine, means actuated by the falling movement of the bar to move the detent pawl into the path of the teeth of the ratchet wheel, a stop for limiting the movement of the pawl when it engages the ratchet wheel and means actuated by the presser roller frame when the presser roller is moved away from the measuring roller, for actuating the detent pawl to release the ratchet wheel from the same.

In testimony whereof, I have hereunto set my hand.

JOHN L. WHEELER.